(12) United States Patent
Boehm

(10) Patent No.: US 10,556,568 B2
(45) Date of Patent: Feb. 11, 2020

(54) USER AUTHENTICATION ACTIVATION SYSTEMS AND METHODS

(71) Applicant: Gentex Corporation, Zeeland, MI (US)

(72) Inventor: Neil J. Boehm, Allegan, MI (US)

(73) Assignee: GENTEX CORPORATION, Zeeland, MI (US)

(*) Notice: Subject to any disclaimer, the term of this patent is extended or adjusted under 35 U.S.C. 154(b) by 47 days.

(21) Appl. No.: 15/834,587

(22) Filed: Dec. 7, 2017

(65) Prior Publication Data

US 2018/0162322 A1 Jun. 14, 2018

Related U.S. Application Data

(60) Provisional application No. 62/431,922, filed on Dec. 9, 2016.

(51) Int. Cl.

| B60R 25/25 | (2013.01) |
|---|---|
| B60R 25/102 | (2013.01) |
| B60R 25/10 | (2013.01) |
| G06K 9/00 | (2006.01) |
| B60R 25/31 | (2013.01) |

(52) U.S. Cl.
CPC ........ B60R 25/255 (2013.01); B60R 25/1001 (2013.01); B60R 25/102 (2013.01); B60R 25/31 (2013.01); G06K 9/00617 (2013.01); G06K 9/00832 (2013.01); *B60R 2025/1016* (2013.01)

(58) Field of Classification Search
CPC . B60R 25/255; B60R 25/1001; B60R 25/102; B60R 25/31; G06K 9/00617; G06K 9/00832
See application file for complete search history.

(56) References Cited

U.S. PATENT DOCUMENTS

| 6,026,340 | A | 2/2000 | Corrado et al. |
|---|---|---|---|
| 6,762,676 | B2 | 7/2004 | Teowee et al. |
| 2014/0309790 | A1 | 10/2014 | Ricci |
| 2015/0363986 | A1 | 12/2015 | Hoyos et al. |
| 2016/0161266 | A1 | 6/2016 | Crawford et al. |
| 2016/0183812 | A1* | 6/2016 | Zhang .................. A61B 5/7246 600/301 |
| 2019/0039570 | A1 | 2/2019 | Foster et al. |

* cited by examiner

*Primary Examiner* — Leon Flores
(74) *Attorney, Agent, or Firm* — Price Heneveld LLP; Bradley D. Johnson

(57) ABSTRACT

A vehicle occupant identification system includes a detection system configured to detect that an individual is proximate a vehicle. The detection system is configured to detect the proximity of an individual by detecting at least one of a door unlock, a key fob, a door opening, a door closing, a seated passenger, and an individual proximate the vehicle. A controller is operably coupled with the detection system and is configured to activate an identification system. The identification system includes an imager configured to illuminate an eye of an occupant of the vehicle and capture at least one image of an iris and a pupil of the eye. A processor is configured to compare the at least one image of the iris of the eye of the occupant with previously stored iris information to identify the occupant and activate the vehicle.

19 Claims, 4 Drawing Sheets

USER AUTHENTICATION ACTIVATION SYSTEMS AND METHODS

CROSS-REFERENCE TO RELATED APPLICATION

This application claims priority to and the benefit under 35 U.S.C. § 119(e) of U.S. Provisional Application No. 62/431,922, filed on Dec. 9, 2016, entitled "USER AUTHENTICATION ACTIVATION SYSTEMS AND METHODS," the disclosure of which is hereby incorporated herein by reference in its entirety.

FIELD OF THE DISCLOSURE

The present disclosure generally relates to an activation system and method for a vehicle, and more particularly to a user authentication activation system and method for a vehicle.

SUMMARY OF THE DISCLOSURE

According to one aspect of the present disclosure, a vehicle occupant identification system includes a detection system configured to detect that an individual is proximate a vehicle. The detection system is configured to detect the proximity of an occupant by detecting at least one of a door unlock, a key fob, a door opening, a door closing, a seated passenger, and an individual proximate the vehicle. A controller is operably coupled with the detection system and is configured to activate an identification system. The identification system includes an imager configured to illuminate an eye of an occupant of the vehicle and capture at least one image of an iris and a pupil of the eye. A processor is configured to compare the at least one image of the iris of the eye of the occupant with previously stored iris information to identify the occupant and activate the vehicle.

According to another aspect of the present disclosure, a vehicle occupant identification system includes a detection system that detects at least one of vehicle interior motion, vehicle exterior motion, a door unlock, a key fob, a door opening, a door closing, a seated passenger, and an individual proximate the vehicle. A controller is operably coupled with the detection system. An identification system is operably coupled with the controller. The identification system captures at least one image of the iris and pupil of the eye. A processor compares the at least one image of the iris of the eye of the occupant with previously stored iris information to identify the occupant and activate the vehicle.

According to yet another aspect of the present disclosure, a vehicle occupant identification system includes a detection system configured to detect an occupant by detecting at least one of a door unlock, a key fob a door opening, a door closing, a seated passenger, and an individual proximate the vehicle. An imager is operably coupled with the detection system and configured to illuminate an eye of an occupant of the vehicle and capture at least one image of at least a portion of the eye. A processor is configured to compare the at least one image of the iris of the eye of the occupant with previously stored biometric information to identify the occupant and activate the vehicle.

These and other features, advantages, and objects of the present disclosure will be further understood and appreciated by those skilled in the art by reference to the following specification, claims, and appended drawings.

DETAILED DESCRIPTION

Figure 1:
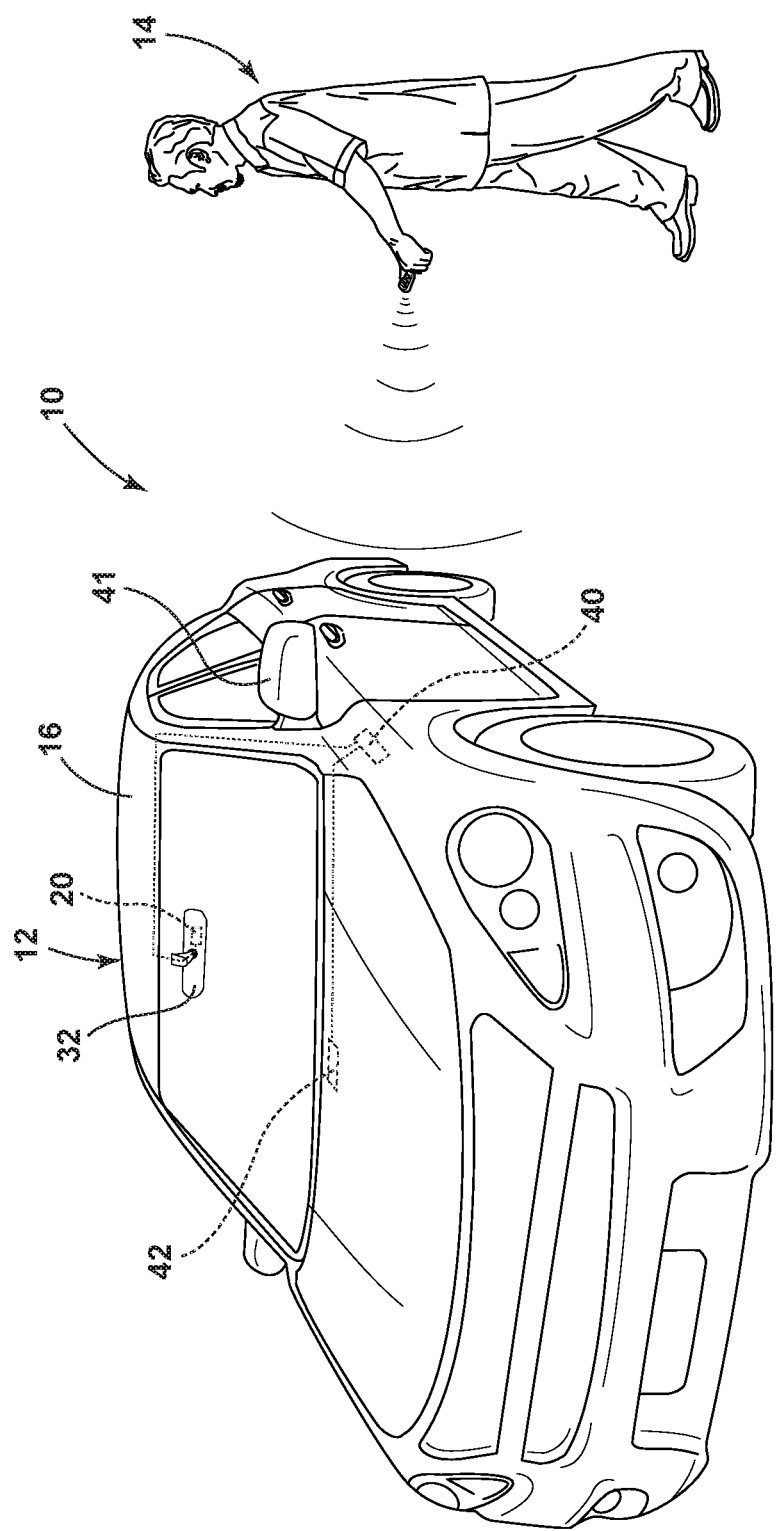
FIG. 1 is a front perspective view of one embodiment of an individual utilizing one instance of a detection system.

The present illustrated embodiments reside primarily in combinations of method steps and apparatus components related to a user authentication activation system and method. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to the intended viewer, and the term "rear" shall refer to the surface of the device further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
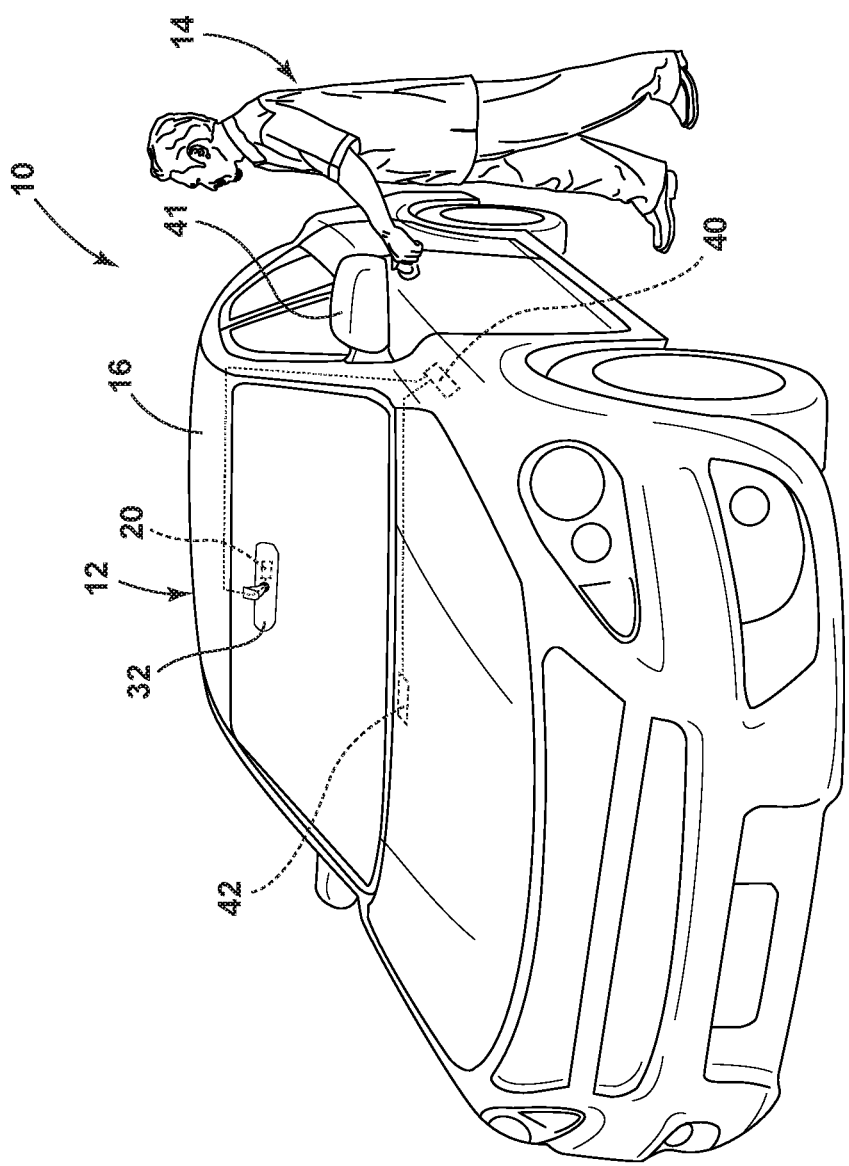
FIG. 2 is a front perspective view of one embodiment of an individual utilizing a second instance of a detection system.
Figure 3:
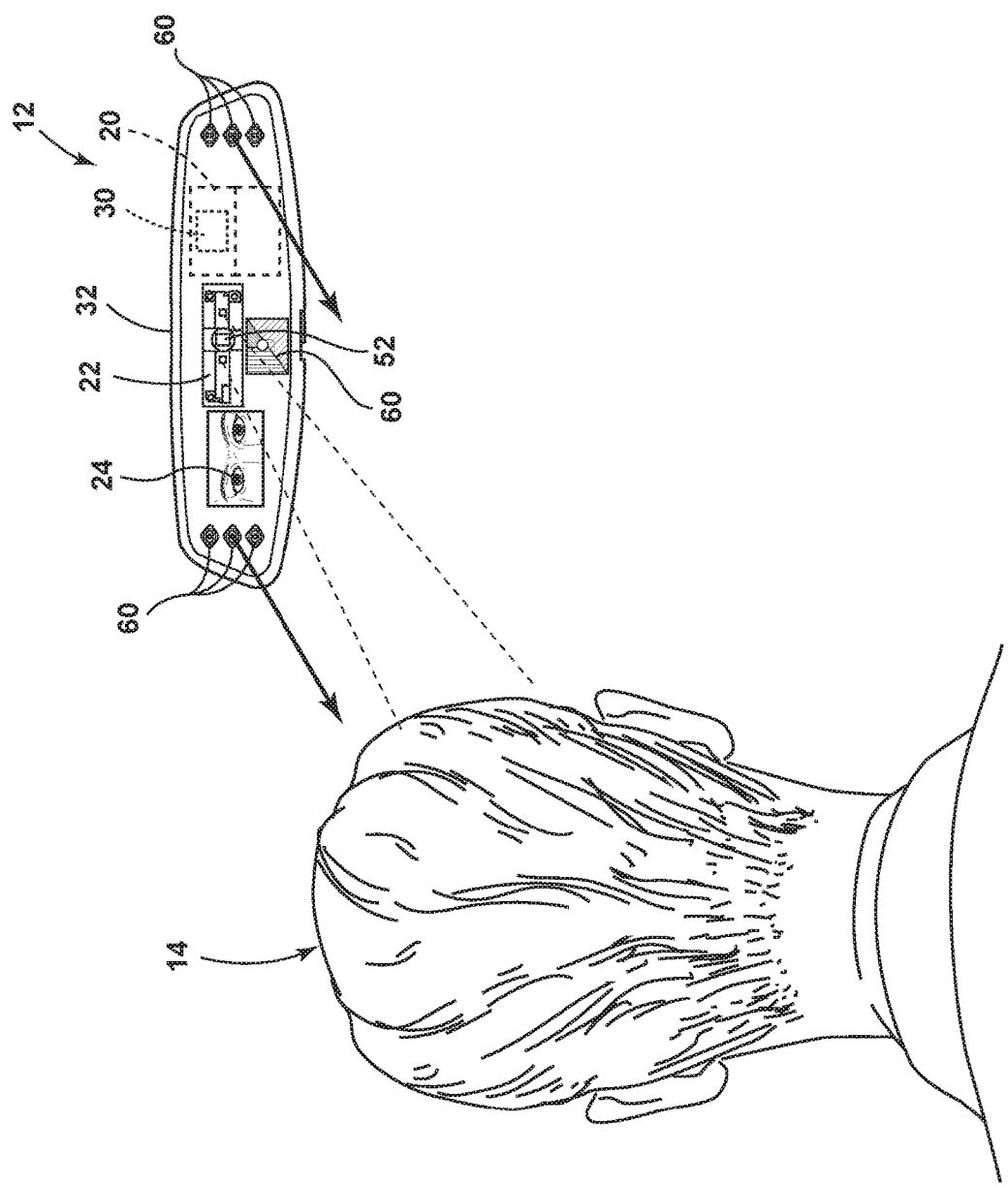
FIG. 3 is a front perspective view of one embodiment of a detection system of the present disclosure.

Referring to FIGS. 1-3, reference numeral 10 generally designates a vehicle occupant identification system that includes a detection system 12 configured to detect an individual 14 that is proximate a vehicle 16. The detection system 12 is configured to detect the proximity of an occupant by detecting at least one of a door unlock, a key fob, a door opening, a door closing, a seated passenger, and an individual proximate the vehicle 16. A controller 20 is operably coupled with the detection system 12 and is configured to activate an identification system 22. The identification system 22 is configured to illuminate an eye 24 of the individual 14 of the vehicle 16 and capture at least one image of the eye 24. A processor 30 of the controller 20 is configured to compare the at least one image of the eye 24 of the individual 14 with previously stored information to identify the occupant and activate the vehicle 16. It will be understood, for purposes herein, an individual is any person, authorized or unauthorized by the identification system 22, that is near the vehicle 16.

With reference again to FIG. 1, it is generally contemplated that the detection system 12 could include features or an interface located in a rearview assembly 32 in the vehicle 16 that can be used to control the detection system 12 settings. The detection system 12 is configured to be utilized within the rearview assembly 32, but may also be positioned elsewhere in or on the vehicle 16. It is also generally contemplated that the detection system 12 may include, or be in communication with, a sensor 40 located on or in the vehicle 16. The sensor 40 may be located on a driver side of the vehicle 16, or may be located within an outside rearview assembly 41 of the vehicle 16. The sensor 40 may be configured to detect various changes in the environment or surroundings of the vehicle 16. For example, the sensor 40 may be a motion sensor, a thermal sensor, a proximity sensor, etc., configured to detect that the individual 14 is approaching, or within a predetermined range of, the vehicle 16. The detection system 12 may be generally configured to detect an individual in close proximity to or within the vehicle 16. In addition to the detection capabilities noted above, the detection system 12 may also be capable of detecting particular individuals based on a heat signature, an output signal from a key fob, detection of an authorized smart phone, a measured occupant weight on a vehicle seat, etc. Once an individual has been detected, permissions associated with use of the identification system 22 may be initiated.

For example, if the detection system 12 is able to determine that an individual is approaching (as illustrated in FIG. 1), then a signal is sent to the controller 20 that an individual is approaching. The controller 20 then activates the identification system 22, if previously authorized to activate upon an individual approaching the vehicle 16. In another example, the detection system 12 may be configured to determine a particular pre-authorized individual is approaching the vehicle 16 based on a heat signature, voice recognition, particular pre-authorized smart phone, particular pre-authorized key fob, etc. In this instance, the detection system 12 sends a signal to the controller 20 that a particular individual is approaching the vehicle 16. The controller 20 then activates the identification system 22. Certain permissions may be granted based on the particular individual. For example, the controller 20 may authorize full use of all features of the vehicle 16 when the owner of the vehicle 16 approaches the vehicle 16, but prohibit modifying vehicle presets (seat position, radio stations, etc.) when a different authorized user approaches the vehicle 16.

The proximity sensors may utilize technology in relation to ultrasonic, capacitive, photoelectric, inductive, or magnetic waves. Alternatively, motion sensors can also be used. The motion sensors may rely on technology related to detection of infrared light, ultrasound, or microwave/radar technology. The sensor 40 may also be operably coupled with a can bus 42 of the vehicle 16. In this instance, a change in the status of devices on the vehicle 16 (e.g., changing from locked doors to unlocked doors) may be detected by the sensor 40, thereby indicating that the individual 14 is approaching the vehicle 16. Alternatively, the sensor 40 may monitor the relative position of one of the doors between open and closed positions, or detect that a hand of an individual is grasping a door handle (FIG. 2). Alternatively, the sensor 40 may be disposed inside the vehicle 16 to detect a heat signature of the individual 14 or an increase in mass on a floorboard or seat of the vehicle 16, resulting from the weight of the individual 14 within the vehicle 16.

Additionally, it is generally contemplated that a variety of sensors 40 may be used individually, or in conjunction with, monitoring the various activities noted above. Further, the sensors 40 may monitor the relative location of the individual 14 before activating the identification system 22. For example, the detection system 12 may detect, via a proximity sensor, that the individual 14 is approaching the vehicle 16. The detection system 12 may wait to activate the identification system 22 until the individual 14 has reached a predetermined distance from the vehicle 16. Alternatively, in another non-limiting example, the proximity sensor may monitor the individual 14 and ultimately activate the identification system 22 when a secondary sensor detects the presence of the individual 14. As an example, the individual 14 may touch a capacitive touch sensor on the door handle, resulting in the detection system 12 activating the identification system 22.

The identification system 22 may also utilize a scanning apparatus 52 that may be disposed on an imager board 54. The imager board 54 may be positioned within the rearview assembly 32. The scanning apparatus 52 may include biometric scanning functionality configured to capture biometric data from the occupant. The relevant biometric data that may be scanned by the scanning apparatus 52 includes biometric data associated with an iris, fingerprint, face, voice, etc., or any combination of these occupant features. The data that is captured in relation to the biometric features of the occupant may be saved in local memory or a remote cloud server that may be accessible via a wireless communication interface to a handheld device or the vehicle 16. Accordingly, the identification system 22 may access the local memory or the remote cloud server to search for and match scanned biometric data and check whether such scanned biometric data corresponds to an identification profile associated with a particular occupant. It will be understood for purposes herein that an occupant includes any of a passenger, rider, or operator of the vehicle 16.

It is generally contemplated that the identification system 22 may also be configured to provide various levels of authorization to various functions of the vehicle 16. Stated differently, the identification system 22 may grant authorization upon recognizing and confirming a particular identification of an occupant. Particular access or privileges are then granted to modify or control various features within the vehicle 16. Based on a particular identification profile, the identification system 22 may access and/or update a variety of preferences or operational parameters in relation to the vehicle 16. In one example, the identification system 22 authenticates a particular occupant and communicates the authentication to the vehicle 16. In response, the vehicle 16 may be configured to receive or identify a plurality of occupant parameters associated with the occupant and the identification profile. These parameters may include features, such as seat position, navigation preferences, climate preferences, lighting, and/or display preferences, radio station presets, etc.

It is also generally contemplated that the identification system 22 may be configured to access and control features that are wirelessly in communication with the vehicle 16. For example, the identification system 22 and the identification profile of a particular occupant may correspond to a trainable wireless accessory that is configured to control a remote electronic system or device. As such, access to the trainable wireless accessories may be gained by the occupant upon identification. These remote devices may include smart devices, including gates, barriers, outside lights, garage doors, etc. The security accessory may correspond to a home link trainable transceiver, such as those disclosed in U.S. Pat. Nos. 6,091,343; 5,854,593; or 5,708,415, the disclosures of which are hereby incorporated herein by reference in their entirety.

The biometric data, as set forth herein, may correspond to image data, audio data, or another form of sensory data. This data may be utilized by the controller 20 to authenticate the occupant. It is also contemplated that various functionality within the vehicle 16 may be granted based on different biometric data provided by the occupant.

The identification system 22 may be disposed in or on an internal rearview device. The identification system 22 may utilize a digital charge coupled device (CCD) or a complementary metal oxide semiconductor (CMOS) active pixel sensor, among other possible sensor devices. The identification system 22 may also include at least one light emitter 60. The light emitters are configured to emit visible light or light in the near infrared range (NIR). The infrared emitters may include one or more light-emitting diodes that work independently or in concert to illuminate the face of the individual. In this configuration, the identification system 22 is configured to illuminate the eyes of the occupant and capture image data related to the irises and/or pupils of the eyes. In addition, visible or audible indicia 60 may be utilized to inform the individual 14 that the individual 14 has been identified.

It is also generally contemplated that the identification system 22 may be operable between activated and non-activated modes, or may be operable between an activated mode and a sleep mode in which minimal energy is used to maintain the activated status of the identification system 22.

In addition, it is generally contemplated that alarm functionality could be provided. For example, if the individual 14 is under duress (e.g., an attacker is forcing the individual 14 to sit in the vehicle 16 and drive the vehicle 16), the individual 14 could perform a secondary activity. For example, the individual 14 could provide the necessary image data to the identification system 22, and at the same time actuate the gas pedal, or hold the inner door handle for a duration of three seconds. Such secondary activity can be used to notify the vehicle 16 that the individual 14 is under duress and this notification can then be provided to the can bus 42, which can prohibit starting of the vehicle 16 and send a distress signal to emergency personnel via a telecommunication system operably linked with the vehicle 16. It will be understood that the secondary activity performed by the individual 14 could be any of a variety of discreet actions generally unnoticeable by an attacker.

Figure 4:
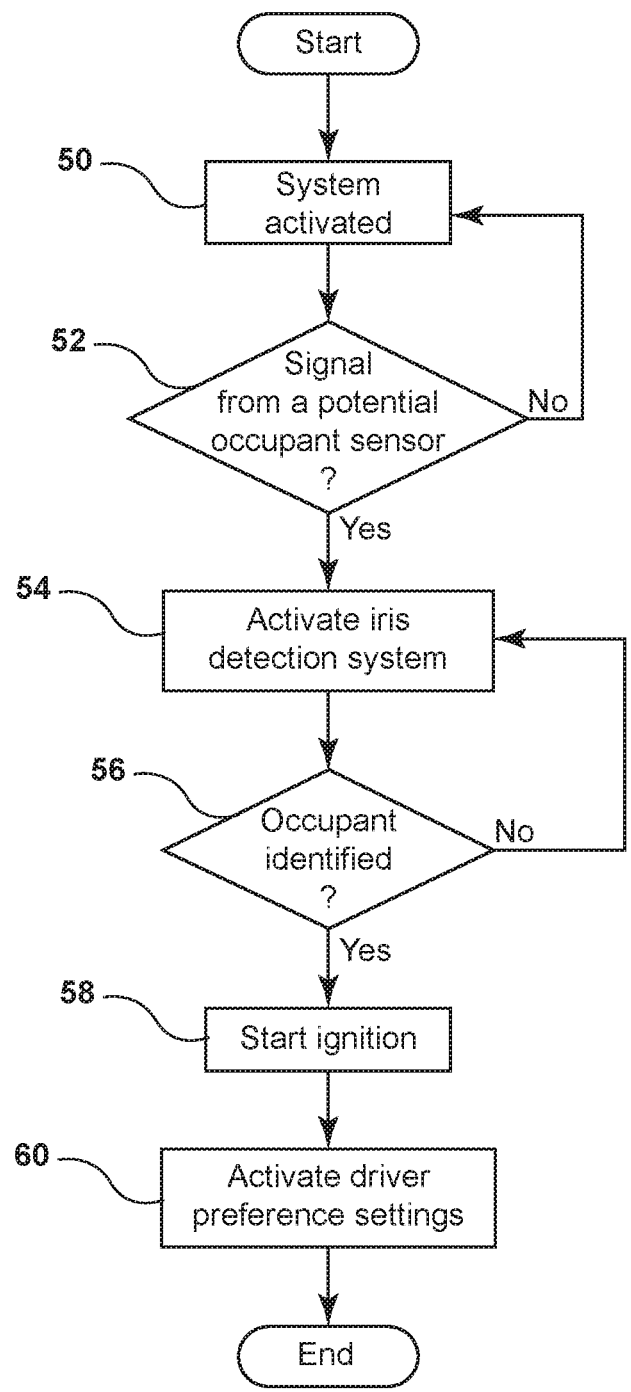
FIG. 4 is a flow chart illustrating the logic of one instance of a detection system of the present disclosure.

With reference now to FIG. 4, operation of one instance of the detection system 12 is generally illustrated. Upon leaving the vehicle 16, the individual 14 can lock or otherwise activate the detection system 12 (step 50). Activation may occur by a remote activation button, locking the vehicle 16, closing the vehicle door, etc. The detection system 12 will maintain activation while the individual 14 is away from the vehicle 16. Upon the individual 14 returning to the vehicle 16, the detection system 12 identifies that an individual 14 is approaching the vehicle 16 (step 52). As the individual 14 approaches the vehicle 16, then the identification system 22 is activated (step 54). Once the identification system 22 is activated, the individual 14 simply allows the identification system 22 to capture image data from the eyes 24 of the individual 14 for analysis. If the occupant can be identified (step 56), then the ignition can be started (step 58), and driver preference settings can be activated (step 60). For example, the seat position and steering wheel position can be adjusted to accommodate the preferences of the individual 14 that has been identified. In the event the occupant cannot be identified, then the detection system 12 maintains activation, waiting for the identification system 22 to properly identify the individual 14. If the individual 14 is not identified, then the vehicle 16 may not start. Also, as noted above, it is generally contemplated that secondary systems may be implemented even when the individual 14 is identified, which may trigger an audible or silent alarm and notify emergency personnel in the event that the person is having a health issue or otherwise being threatened within or outside the vehicle 16.

The detection system 12, as set forth herein, minimizes energy consumption by the identification system 22. By monitoring individuals in and around the vehicle 16, the detection system 12 increases battery life and also lessens excessive activation and use of the identification system 22, thereby increasing the life expectancy of the identification system 22.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle occupant identification system comprising:
   a detection system including a proximity sensor configured to detect that an individual is proximate a vehicle;
   a secondary sensor that detects when the individual is in position for identification;
   a controller operably coupled with the secondary sensor and configured to activate an identification system, the identification system including an imager configured to illuminate an eye of an occupant of the vehicle and capture at least one image of an iris and a pupil of the eye; and
   a processor configured to compare the at least one image of the iris of the eye of the occupant with previously stored iris information to identify the occupant and activate the vehicle.

2. The vehicle occupant identification system of claim 1, wherein the controller is disposed within a rearview assembly of the vehicle.

3. The vehicle occupant identification system of claim 1, wherein the proximity sensor of the detection system is disposed proximate a driver side of the vehicle.

4. The vehicle occupant identification system of claim 3, wherein the proximity sensor of the detection system is disposed within an outside rearview assembly of the vehicle.

5. The vehicle occupant identification system of claim 4, wherein the identification system includes an imager board disposed within an inside rearview assembly.

6. The vehicle occupant identification system of claim 3, wherein the proximity sensor of the detection system monitors the occupant and activates the identification system when the secondary sensor detects a presence of the occupant.

7. The vehicle occupant identification system of claim 1, wherein the identification system is configured to illuminate the eye of the occupant with infrared light before capturing the at least one image.

8. The vehicle occupant identification system of claim 1, wherein the identification system includes indicia indicating the at least one image has been captured.

9. The vehicle occupant identification system of claim 1, further comprising:
   alarm functionality associated with a secondary activity of the occupant.

10. The vehicle occupant identification system of claim 9, wherein the alarm functionality includes notification to the vehicle that the occupant is under duress, the notification being provided to a vehicle Controller Area Network bus (CAN bus), prohibiting starting of the vehicle and sending a distress signal to emergency personnel via a telecommunication system operably linked with the vehicle.

11. A vehicle occupant identification system comprising:
    a detection system disposed in an exterior mirror assembly of a vehicle and which detects when at least one of an individual, a key fob, and a smart phone are proximate the vehicle;
    a controller operably coupled with the detection system;
    an identification system disposed in an interior mirror assembly and operably coupled with the controller, the identification system capturing at least one identifying image of the individual; and
    a processor that compares the identifying image of an iris of the individual with previously stored identifying images to identify the individual and activate the vehicle.

12. The vehicle occupant identification system of claim 11, wherein the detection system includes a sensor disposed proximate a driver side of the vehicle.

13. The vehicle occupant identification system of claim 12, wherein the sensor is disposed within the exterior mirror assembly of the vehicle.

14. The vehicle occupant identification system of claim 11, further comprising:
    alarm functionality associated with a secondary activity of the individual.

15. The vehicle occupant identification system of claim 14, wherein the alarm functionality includes notification to the vehicle that the individual is under duress, the notification being provided to a CAN bus, prohibiting starting of the vehicle and sending a distress signal to emergency personnel via a telecommunication system operably linked with the vehicle.

16. A vehicle occupant identification system comprising: a detection system configured to detect an occupant by detecting at least one of a door unlock, a key fob, a door opening, a door closing, a seated passenger, and an individual proximate a vehicle; an imager operably coupled with the detection system and configured to illuminate an eye of an occupant of the vehicle and capture at least one image of at least a portion of the eye; a processor configured to compare the at least one image of an iris of the eye of the occupant with previously stored biometric information to identify the occupant and activate the vehicle; an alarm system that may be intentionally activated by the occupant after identification of the occupant, wherein the alarm system is configured to at least one of disable the vehicle and notify emergency personnel; and a secondary sensor that detects when the occupant is in position for the identification.

17. The vehicle occupant identification system of claim 16, wherein the detection system includes a sensor disposed proximate a driver side of the vehicle.

18. The vehicle occupant identification system of claim 17, wherein the sensor is disposed within an outside rearview assembly of the vehicle.

19. The vehicle occupant identification system of claim 17, wherein the sensor monitors the occupant and activates said vehicle occupant identification system when the secondary sensor detects a presence of the occupant.

* * * * *